J. G. Perry,
Sausage Filler.
№ 75,966.        Patented Mar. 24. 1868.
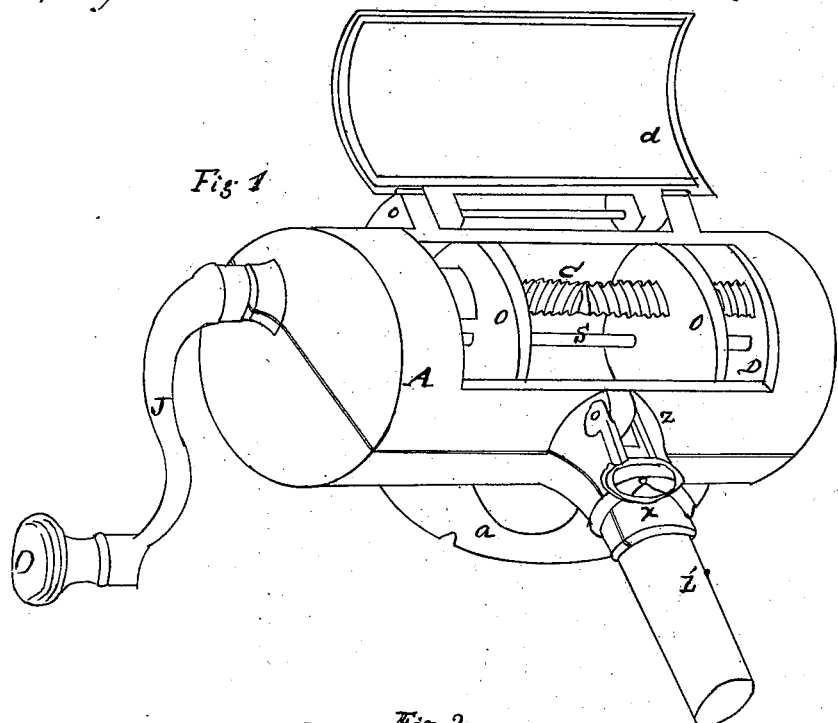
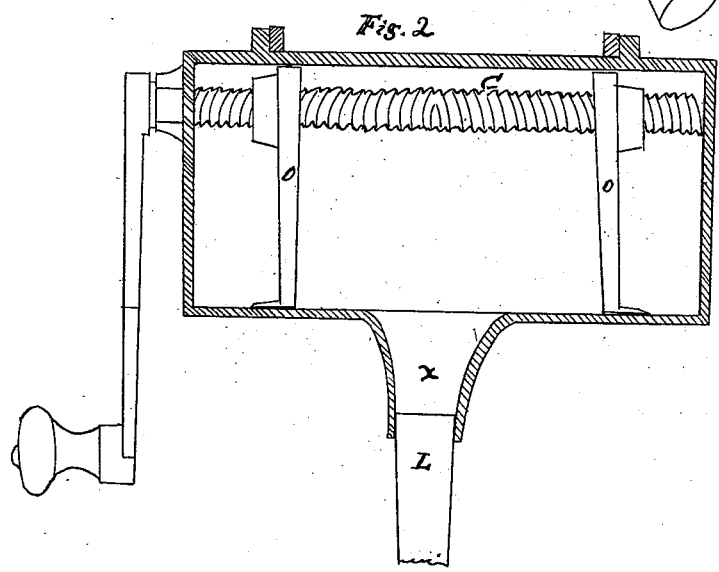
Witness
Asa F. Gardner
James H. Allen
John G. Perry

United States Patent Office.

JOHN G. PERRY, OF SOUTH KINGSTON, RHODE ISLAND.

Letters Patent No. 75,966, dated March 24, 1868.

IMPROVED SAUSAGE-FILLER.

*The Schedule referred to in these Letters Patent and making part of the same.*

TO ALL WHOM IT MAY CONCERN:

Be it known that I, JOHN G. PERRY, of South Kingston, in the county of Washington, in the State of Rhode Island, have invented new and useful Improvements in Machines for Filling Sausages; and I do hereby declare that the following is a full and correct description thereof, reference being had to the accompanying drawings, forming part of this specification, and to the letters of reference marked thereon, similar letters in all the figures denoting the same parts.

Figure 1 is a perspective view of the machine.

Figure 2 is a horizontal section.

The construction of my improved filler is as follows: A is an oblong case, with a circular supporting-flange, $a$. A screw, C, is placed lengthways in the case, and turns in bearings at either end. One half of the screw has a right-hand thread made upon it, and the other half has a left-hand thread, and upon each half is put a follower, $o\ o$, having screw-threads cut in their holes to correspond with the threads upon their respective divisions of the shaft or screw. The screw C is placed on one side of the centre of the case, to prevent the followers $o\ o$ from turning around in the case, and also to allow of the case being more readily filled with meat, or the screws may be placed in the centre of the case, and a spline inserted, to prevent the followers from turning. The followers $o\ o$ are connected together by a rod, S, to prevent them from getting out of their proper relative position to each other when taken out of the case. An opening, $x$, with a nozzle, is made in one side of the filler-case for the meat to be discharged through. An opening, D, with a cover, $d$, is made in the upper part of the case, for the purpose of filling it with meat. The screw has bearings in the ends of the case, so that the screw does not move in or out of the case when turned.

The operation is as follows: The crank, J, is turned backwards until the followers $o\ o$ are at the ends of the case, and the space between them having been filled with meat through the opening D, the cover is closed and secured by the catch $z$. The crank, J, is now turned forward, and the follower or followers moved upon the screw, and the meat forced out of the nozzle L into the cases.

The great advantage obtained is the ease and rapidity with which the work is accomplished.

Having thus described my sausage-filler, I claim—

One or more of the followers $o\ o$, in combination with the screw C, all working within the case, substantially as described and for the purpose set forth.

JOHN G. PERRY.

Witnesses:
 ASA F. GARDNER,
 JAMES H. ALLEN.